(No Model.)
J. L. PEDE.
HAND FERTILIZER DISTRIBUTER AND PLANTER.
No. 590,906. Patented Sept. 28, 1897.
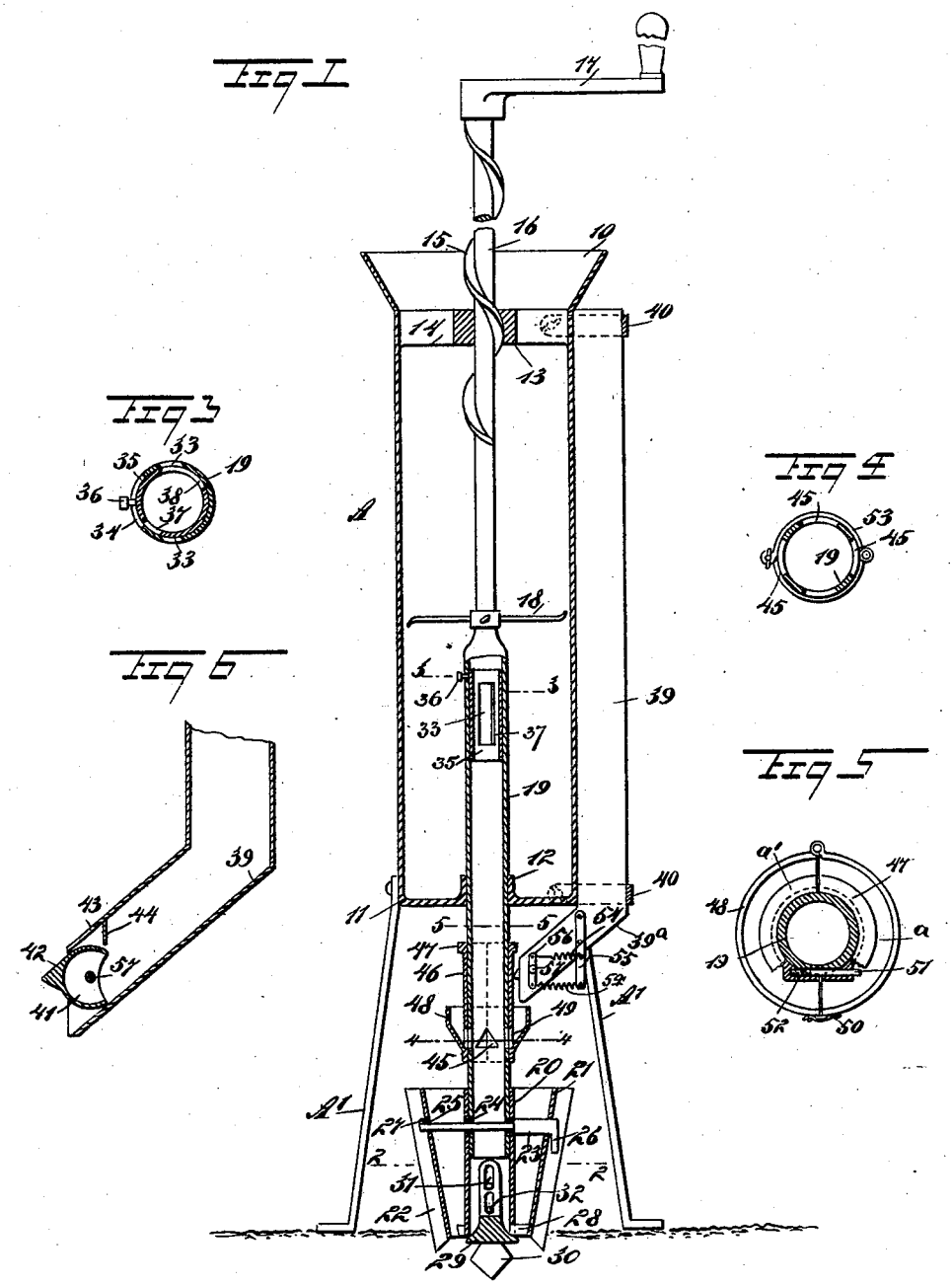
WITNESSES:
H. Walker
Fred Acker
INVENTOR
J. L. Pede
BY
ATTORNEYS.

UNITED STATES PATENT OFFICE.

JAMES L. PEDE, OF SACKETT'S HARBOR, NEW YORK.

HAND FERTILIZER-DISTRIBUTER AND PLANTER.

SPECIFICATION forming part of Letters Patent No. 590,906, dated September 28, 1897.

Application filed May 13, 1897. Serial No. 636,373. (No model.)

*To all whom it may concern:*

Be it known that I, JAMES L. PEDE, of Sackett's Harbor, in the county of Jefferson and State of New York, have invented a new and Improved Hand Fertilizer-Distributer and Planter, of which the following is a full, clear, and exact description.

The object of my invention is to provide a hand implement through the medium of which fertilizing material may be placed in hills and also whereby through the medium of the same implement seed may be dropped in the hills immediately following the delivery of the fertilizing material, or whereby the implement may be used for planting seed only or for distributing fertilizing material only.

Another object of the invention is to provide an implement of the character above set forth which will be very light, durable, and economic, and capable of being expeditiously and conveniently operated.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical central section through the implement. Fig. 2 is a transverse section on the line 2 2 of Fig. 1. Fig. 3 is a transverse section on the line 3 3 of Fig. 1. Fig. 4 is a transverse section taken on the line 4 4 of Fig. 1, the seed-cup being removed, and illustrating the application of a cover for the opening in the support for the seed-cup. Fig. 5 is a transverse section on the line 5 5 of Fig. 1, and Fig. 6 is a vertical section of the lower portion of the seed-receptacle.

The receptacle A, adapted to hold the fertilizing material, is preferably of greater length than width and somewhat rectangular in cross-section, being provided with a flaring top 10, and its bottom is closed, except at the center, where an opening is formed surrounded by a flange 12. A nut 13 is held by arms 14 in the upper portion of the receptacle A, the said nut receiving an exterior thread 15, formed upon the upper end of a rotary shaft 16, the thread 15 being preferably of a long pitch and a left-hand thread. A handle 17 is secured to the upper end of the shaft 16.

The shaft is solid for about one half its length, the other half being enlarged and tubular, as shown at 19 in Fig. 1. The tubular section of the shaft is open at the bottom, and just above the tubular section 19 agitating-arms 18 are secured upon the shaft 16, serving to loosen the material in the receptacle A. A tube 20 is slipped over the lower portion of the tubular section 19 of the shaft, the tube 20 constituting the inner portion of an inverted cone 21, having vertical ribs 22 upon its outer face, which ribs extend below the bottom of the cone and are given a downward and inward inclination. The cone is held upon the tubular portion of the shaft through the medium of a key 23 or its equivalent, which key is passed through openings 24 in the tubular portion of the shaft and registering openings in the inner wall 20 of the cone, the key being likewise passed through a slot 25, made in the outer wall of the cone. One end of the key 23 is made thicker than the remaining portion and is provided with a crank-arm 26, while at the thinner extremity of the key a lug 27 is formed, and this end of the key is made to enter the slot 25, which is in the shape of a keyhole-slot. When the lug 27 points in one direction and the crank-arm 26 of the key in the opposite direction, the cone will be locked to the shaft. The outer and inner portions of the cone are connected by straps 28 or their equivalents.

Just below the lower end of the central tubular portion 20 of the cone a block 29 is supported, being preferably in the shape of a disk, and a drill 30 is secured to the under central portion of this block, the drill being preferably of diamond shape or polygonal. The block 29 is provided at each side with an upwardly-extending slotted arm 31, and the block is loosely supported in the cone by passing screws 32 through the slots in the arms 31, as shown in Fig. 1. The blades or ribs 22 at the exterior of the cone serve to pulverize the earth around the opening that will be made by the drill 30.

At the upper portion of the tubular section of the shaft 16 two openings 33 are made, preferably diametrically opposite, together with a third diametrical opening 34. At this portion of the tubular section of the shaft an interior gate or cut-off 35 is held to turn, being moved by a set-screw 36, attached to said gate or cut-off and extending out through the diametrical opening 34, as illustrated in Fig. 3. Two openings 37 and 38 are made in the cut-off or gate 35, which latter is of cylindrical form, and the opening 38 is longer than the opening 37, one of the openings 37 and 38 being adapted for registry, each with an opening 33 in the shaft. The opening 38 is made longer than the opening 37 in order that one of the openings in the shaft may be entirely closed and the other opening left open to a greater or less extent, or whereby both openings may be left entirely open or partially closed. The fertilizing material enters the tubular section of the shaft through the side openings in said shaft and through the openings in the gate or cut-off.

In the operation of distributing fertilizer into hills or into depressions in the ground the fertilizer-receptacle A is brought over the spot to be fertilized and made to rest upon the ground through the medium of attached legs A'. The crank 17 is then turned to the left, whereupon the drill, when it reaches the ground, will commence to form an opening of desired depth. While the shaft is revolved by the turning of the handle 17, the fertilizer material will have entered the tubular section of the shaft. Upon reversing the movement of the handle 17 the shaft 16 will be carried upward, the drill remaining in the ground, since the drill is loosely supported by the pulverizing-cone, and when the cone and the shaft 16 have been raised sufficiently to provide an opening between the bottom of the cone and the block 29 the fertilizing material contained in the tubular section of the shaft will run out and fall into the openings made by the drill and around said openings. When the shaft has been carried upward a sufficient distance to bring the screws 32 in engagement with the upper walls of the slots in the arms 31, the drill will be carried out of the ground. The block carrying the drill only closes the lower opening in the cone when the drill is in the ground and the weight of the cone is upon said block.

When the implement is to be used for planting seed together with depositing fertilizing material, a seedbox 39 is attached by straps 40 or their equivalents to one side of the receptacle A, the lower end 39ª of the seedbox being carried below the receptacle and given a downward inclination. At the lower or delivery end of the seedbox 39 a seed-discharge cup 41 is pivoted, the said cup being normally held with its mouth inward through the medium of a lug 42, which projects from the back of the cup and is adapted to pass up through a slot 43 in the top of the box. A shield 44 may be used to prevent any seed passing through the slot 43. The lug 42 projects out beyond the delivery end of the seedbox and is quite close to the tubular section of the shaft 16.

Below the seedbox in the tubular section of the shaft a number of openings 45 are made, and a sleeve 46 surrounds the shaft above and below the openings 45, the said sleeve being provided at its upper end with a flange 47, and at the lower end of the sleeve a basin 48 is secured, having its lower walls inclined in direction of the shaft, and the said sleeve is provided with openings 49, which register with the openings 45 in the shaft, as shown best in Fig. 1. In order that the sleeve and its basin may be readily placed upon the shaft or disconnected therefrom, these parts are made in two sections $a$ and $a'$, as shown in Fig. 5, the sections being hinged and connected by a latch 50, and are secured to the shaft by a pin 51, which is carried from one section of the sleeve to the other and screwed into an offset 52, formed upon the shaft. When the seed attachment is not employed, the sleeve and basin are removed and the openings 45 in the tubular section of the shaft are closed by a hinged strap 53 or the equivalent thereof, as illustrated in Fig. 4. The lug 42 simply assists in holding the seed-distributing cup in position, it being primarily held in its normal or receiving position by springs 54, attached to a projection 55 from the lower portion of the seedbox, and a cross-bar 56, secured to the pivot 57, upon which the cup is secured. When the seed attachment is used in connection with the mechanism for distributing fertilizing material, the fertilizing material is first dropped, and when the flange 47 on the sleeve 46 strikes the lug 42, which occurs when the shaft is being carried upward, the lug will also be forced upward and the seed-distributing cup will be made to face outward and discharge its contents into the basin 48, from whence the seed will drop into the lower portion of the tubular section of the shaft and out through the bottom of the cone as soon as the cone shall have left the drill-block.

Having thus described my invention, I claim as new and desire to secure by Letters Patent—

1. A receptacle for fertilizing material and the like, a shaft held to rotate in the receptacle, a portion of said shaft being tubular, a feed for the shaft, means, substantially as described, for establishing communication between the tubular portion of the shaft and the said receptacle, and a drill carried by the lower portion of the shaft, for the purpose described.

2. The combination, with a receptacle, and a shaft having a screw-feed and a lower tubular section, the shaft being mounted to turn in the said receptacle and extend out therefrom, the upper portion of the tubular section having a valved opening, of a drill carried by the lower portion of the shaft, and a pulverizer also carried by the shaft, being located adjacent to the drill.

3. The combination, with a receptacle, a shaft held to revolve in said receptacle, extending beyond the ends thereof, the lower portion of the shaft being tubular, and means for turning the shaft and for feeding the shaft in a longitudinal direction, of a drill carried by the lower portion of the tubular section of the shaft, and having play in said shaft, a conical pulverizer also carried by the tubular section of the shaft, independent of the drill yet surrounding the same, and a means for establishing communication between the tubular section of the shaft and the interior of the said receptacle, for the purpose specified.

4. The combination, with a receptacle and a screw-shaft held to turn in said receptacle, the lower portion of the shaft being tubular, said tubular portion of the shaft within the receptacle having openings provided with cut-offs, of a drill, an apertured support for the said drill, the said support being mounted in the lower portion of the tubular portion of the shaft and capable of movement therein, and a pulverizer carried by the shaft adjacent to the drill.

5. The combination, with a receptacle, a screw-shaft held to turn in said receptacle, the lower portion of the shaft being tubular, the said tubular section of the shaft within the receptacle having openings provided with cut-offs, and an agitator carried by said shaft, of a drill, a support for said drill, said support being mounted in the lower portion of the tubular section of the shaft, and capable of movement therein, a pulverizer carried by the shaft adjacent to the drill, a seedbox, a basin receiving the seed from the box and communicating with the interior of the tubular section of the shaft, and a trip carried by said shaft, arranged for engagement with the seed-discharging cup, for the purpose specified.

6. The combination, with a receptacle, a shaft, means for turning said shaft and for raising and lowering the same, the lower portion of the shaft being tubular and provided with openings, of a sectional sleeve having openings corresponding to the openings in the shaft, said sleeve being removably attached to the shaft, a basin carried by the sleeve below the openings in the same, a seed-box, and a tension-controlled seed-distributing cup located in the box, said cup being tripped in one direction by the movement of the shaft, for the purpose specified.

7. In a hand-planter, a support, a shaft held to turn in said support, means for raising and lowering said shaft, a drill carried by the shaft, and a pulverizer secured to the shaft, surrounding said drill.

8. In a hand-planter, a screw-shaft having a tubular section, a drill loosely mounted upon the tubular section of the shaft, and a pulverizer shaped substantially as an inverted cone attached to the shaft, the lower portion of the pulverizer surrounding the said drill, for the purpose specified.

JAMES L. PEDE.

Witnesses:
E. C. KNOWLTON,
DWIGHT C. TUTTLE.